Sept. 5, 1961  H. W. SCHAUFELBERGER ET AL  2,998,789
CONTACT SPRING HOLDING FIXTURE
Filed Aug. 14, 1958
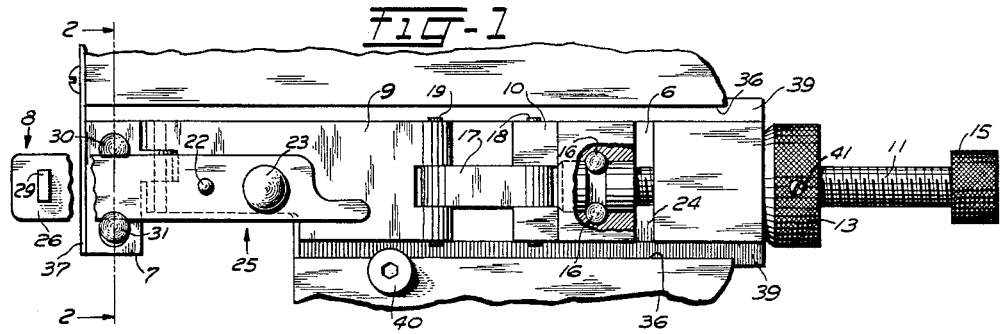
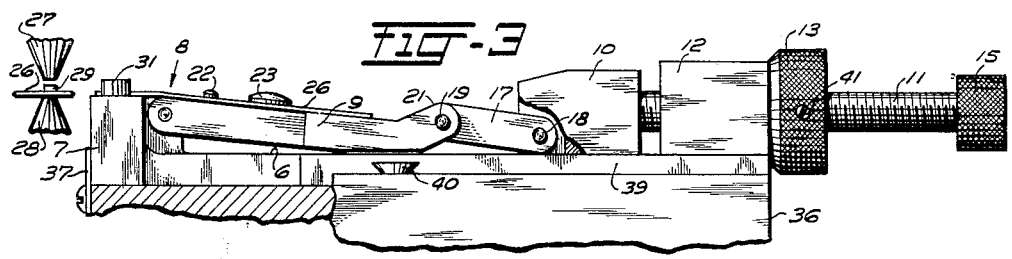
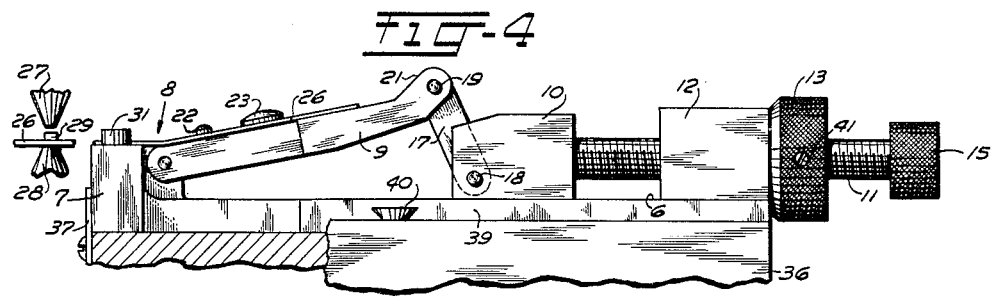
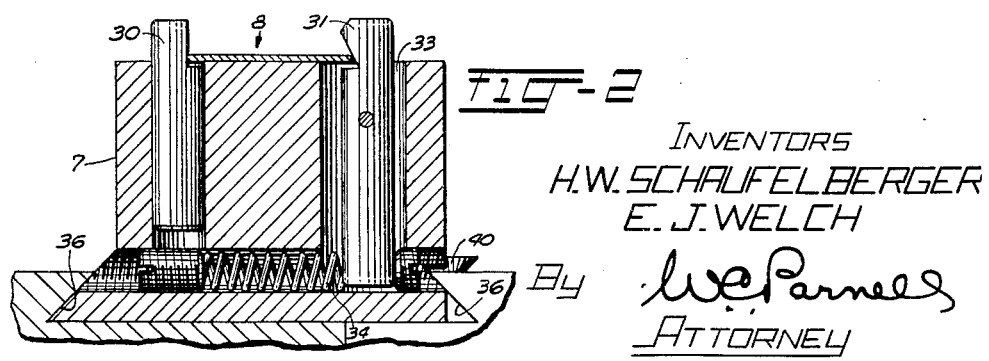
INVENTORS
H. W. SCHAUFELBERGER
E. J. WELCH
By W. C. Parnell
ATTORNEY

United States Patent Office 2,998,789
Patented Sept. 5, 1961

2,998,789
CONTACT SPRING HOLDING FIXTURE
Henry W. Schaufelberger, Union, N.J., and Edwin J. Welch, New York, N.Y., assignors to Western Electric Company, Incorporated, New York, N.Y., a corporation of New York
Filed Aug. 14, 1958, Ser. No. 754,990
5 Claims. (Cl. 113—99)

This invention relates to article holding devices and particularly to a fixture for accurately locating contact springs in welding apparatus while electrical contacts are welded thereto.

In welding precious metal contacts to preformed contact springs for jacks, as are found, for example, in telephone equipment, it is necessary to accurately position the end of the jack springs between a pair of welding electrodes in order that the automatically fed contact bar stock be accurately positioned with respect to the spring and securely welded thereto. Due to the large number of different types of jacks in common use, jack springs must be fabricated with a wide variety of angular bends therein. The variations in the bends in the springs are necessary in order that the contacts on the springs be properly aligned and operate in the desired sequence for the particular type of jack in which they are used. Heretofore, special holding fixtures were utilized for each of the different types of jack springs in order to accurately position them in the welding apparatus. In addition to the disadvantage of stocking a large number of holding fixtures, considerable time was required for changing the fixtures to adapt a particular welding machine to fabrication of the various types of springs.

The main object of this invention is the accurate positioning of contact springs in the welding apparatus without requiring special locating fixtures for each of the different types of springs.

In a preferred embodiment of the invention, guides at one end of the fixture orient a spring laterally therein while a pivotally mounted member, having a guide pin thereon for insertion into one of the assembly apertures in the spring, orients the longitudinal disposition of the spring so that it extends a prescribed amount into the welding apparatus. The desired angular disposition of the extending end of a spring in the welding apparatus, regardless of the size of the bend therein, is obtained by adjusting the angular disposition of the pivoted member.

These and other features of the invention may be more fully understood from the following detailed description when taken in conjunction with the accompanying drawing, in which:

FIG. 1 is a plan view of a preferred embodiment of the invention showing a contact spring for a jack in light lines thereon;

FIG. 2 is a view of the lateral orienting structure for the contact springs as seen along the plane 2—2 of FIG. 1;

FIG. 3 is a side elevational view of the device of FIG. 1, and

FIG. 4 is a side elevational view of the device of FIG. 1, adjusted to accommodate a spring of different bend, from that disclosed in FIG. 3.

Referring now to the drawing, the fixture includes a base 6 having an end 7 for laterally orienting a contact spring 8 thereon, a support member 9 pivotally mounted to the end 7 of the base for arcuate movement thereon when actuated by a linearly movable slide block 10 which, in turn, is movable along the base by the rotation of a manually operated lead screw 11 cooperating with an internally threaded member 12 fixed to the base. An internally threaded element 13 on the lead screw 11 may be tightened against the fixed member 12 to lock the support member 9 in any adjusted position by preventing rotation of the lead screw. A set screw 41 in the element 13 may be turned down to engage the lead screw to secure the locking element thereto to facilitate reproducing any particular setting in the event it is desired to temporarily change the setting of the support member 9. A knurled end piece 15 on the end of the lead screw facilitates manual rotation thereof. The other end of the lead screw is rotatable in a cylindrical hole in the slide block and is provided with a circumferential groove cooperating with dowels 16 extending through the slide block 10 and through the groove so that the lead screw is free to rotate in the hole, but is prevented from moving longitudinally with respect thereto.

The ends of an elongated link element 17 are pivotally mounted between block 10 and support member 9; one end, by pin 18 to the block 10 and the other end by pin 19 to the end of the support member 9. The pin 19 on the support member is mounted to a raised portion 21 thereof above a line interconnecting the base pivot of the support member 9 and the pivot 18 so that the support 9 may be raised from a position shown in FIG. 3 whenever the lead screw is advanced to the left, even though the support 9 may be in its lowest position.

The support member 9 has two locating pins 22 and 23 extending upwardly cooperating with correspondingly spaced apertures in the contact springs for aligning the longitudinal disposition of the spring 8 so as to have end portion 26 extended beyond the end 7 of the fixture a prescribed amount as required for the welding of the contacts 29 thereto. The apertures in the contact springs which cooperate with the locating pins 22 and 23 are provided therein for assembly purposes and are normally spaced a predetermined uniform distance from the contact end of the springs. For this reason, they serve as convenient locating means for positioning the contact springs on the fixture. Although two pins 22 and 23 are disclosed, one pin would suffice to provide for this locating function. As seen in FIG. 1, a recess 25 in the support member and the base 7, extending under the side of a contact spring thereon, permits access to the spring to facilitate its removal after a contact 29 has been welded thereto.

The fixture itself is provided with bevelled sides 39 for locating or accurately positioning the fixture on the welding equipment, the sides fitting in dovetail arrangement in complementary bevelled ways 36. The fixture is simply slipped into the ways until the end 7 engages a stop plate 37 at the end of the ways. A lock screw 40 on the welding equipment may be tightened against one of the sides 39 to secure the fixture in the ways.

The angular disposition of the support member 9 is selected for the particular bend in the contact spring 8. Two different positions are shown in FIGS. 3 and 4 for purposes of illustration as to how the fixture would be adjusted to accommodate two springs having different bends. A calibrated scale 24 on the base makes it possible for the operator to quickly position the linearly movable slide block 10 to predetermined positions on the base 6 as required for the various bends in the contact springs. The angular disposition of the support member 9 determines the angular disposition of the overhanging or extending end 26 between welding electrodes 27 and 28 which must be carefully controlled to obtain a satisfactory bonding of the contact to the contact spring when the welding electrodes are actuated.

The lateral disposition of the spring 8 is controlled by the guide pins 30 and 31 on the end 7. It is to be noted that one pin 30 is fixed, while the other pin 31 is pivoted and free to move within an enlarged opening 33, as seen in FIG. 2. A helical spring 34 normally urges the contact spring engaging portion of pin 31 toward the pin 30 so as to exert a holding force on a contact spring positioned therebetween. By making one of the pins resilient, the loading of the spring on the fixture is facilitated, the operator simply slipping the contact spring against the pin 31 urging it back to position it down between the two pins.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fixture for accurately locating one of the ends of contact springs for welding electrical contacts thereto, said springs having at least one aperture therein uniformly spaced from the contact ends thereof and having a bend in an intermediate portion so that the two ends are angularly disposed to each other, which comprises a base member, guide members projecting upwardly from one end of the base for engaging opposite sides of a contact spring to orient the lateral disposition of the spring on the fixture, a contact spring support member having one end pivotally connected to said one end of the base and having a guide pin extending upwardly therefrom and adapted to engage the aperture in the spring to orient the longitudinal disposition of the spring in the fixture so that the end of the spring extends from the fixture by a predetermined amount, and means connected to the other end of the support member for pivoting said support member in accordance with the particular bend in the spring to accurately control the angular disposition of the extended end of the spring.

2. A fixture for accurately locating one of the ends of contact springs in apparatus for welding electrical contacts thereto, said springs having at least one aperture therein uniformly spaced from the contact ends thereof and having a bend in an intermediate portion so that the two ends are angularly disposed to each other, which comprises a base member, guide members projecting upwardly from one end of the base for engaging opposite sides of a contact spring to orient the lateral disposition of the spring on the fixture, a contact spring support member having a guide pin extending upwardly therefrom and adapted to engage the aperture in the spring to orient the longitudinal disposition of the spring in the fixture so that the end of the spring extends from the fixture by a predetermined amount, means pivotally connecting one end of the support member to said one end of the base, a slide block, an elongated element having one end pivotally connected to the slide block and the other end pivotally connected to the other end of the support member, means for moving the slide block linearly along the base toward and away from said one end, and means cooperative with said moving means for positioning the slide block along the base to pivot the support member in accordance with the particular bend in the spring to accurately control the angular disposition of the extended end of the spring.

3. A fixture for accurately locating one of the ends of contact springs in apparatus for welding electrical contacts thereto, said springs having at least one aperture therein uniformly spaced from the contact ends thereof and having a bend in an intermediate portion so that the two ends are angularly disposed to each other, which comprises a base member, guide members projecting upwardly from one end of the base for engaging opposite sides of such a contact spring to orient the lateral disposition of the spring on the fixture, a contact spring support member disposed on the upper side of the base and having a guide pin extending upwardly therefrom adapted to engage the aperture in the spring to orient the longitudinal disposition of the spring in the fixture so that the end of the spring extends from the fixture by a predetermined amount, means pivotally connecting one end of the support member to said one end of the base, a slide block, means for moving the slide block linearly along the base toward and away from said one end, an elongated element having one end pivotally connected to the slide block and the other end pivotally connected to the other end of the support member, an internally threaded member on the other end of the base, an externally threaded rotatable element extending through and in engagement with the internally threaded member for positioning the slide block along the base to pivot the support member in accordance with the particular bend in the spring to accurately control the angular disposition of the extended end of the spring, graduations on the base spaced along the reciprocatable path of the slide block for accurately locating the slide block thereon for positioning the support member in predetermined angular settings as required for contact springs having various degrees of bends therein.

4. A fixture for accurately locating one of the ends of contact springs in apparatus for welding electrical contacts thereto, said spring having at least one aperture therein uniformly spaced from the contact ends thereof and having a bend in an intermediate portion so that the two ends are angularly disposed to each other, which comprises a base member, means for mounting the base member in a predetermined position with respect to the welding apparatus, guide members projecting upwardly from one end of the base for engaging opposite sides of a contact spring to orient the lateral disposition of the spring on the fixture, one of said guide members being fixed to said one end of the base and the other being movable toward and away from the fixed guide member, resilient means for normally urging the movable member to engage, in clamping condition, a contact spring between the guide members, a contact spring support member disposed on the upper side of the base and having a guide pin extending upwardly therefrom adapted to engage the aperture in the spring to orient the longitudinal disposition of the spring in the fixture so that the contact end of the spring extends from the fixture by a predetermined amount, means pivotally connecting one end of the support member to said one end of the base, a slide block movable linearly along the base toward and away from said one end, an elongated element having one end pivotally connected to the slide block and the other end pivotally connected to the other end of the support member, an internally threaded member on the other end of the base, an externally threaded rotatable element extending through and in engagement with the internally threaded member for positioning the slide block along the base to pivot the support member in accordance with the particular bend in the spring to accurately control the angular disposition of the extended end of the spring with respect to the welding apparatus, and graduations on the base spaced along the reciprocatable path of the slide block for accurately locating the slide block thereon for positioning the support member in predetermined angular settings as required for contact springs having various degrees of bends therein.

5. A fixture for accurately locating one of the ends of contact springs in apparatus for welding electrical contacts thereto, said springs having at least one aperture therein uniformly spaced from the contact ends thereof and having a bend in an intermediate portion so that the two ends are angularly disposed to each other, which comprises a base member, means for mounting the base member in a predetermined position with respect to the welding apparatus, guide members projecting upwardly from one end of the base for engaging opposite sides of a contact spring to orient the lateral disposition of the spring on the fixture, one of said guide members being fixed to said one end of the base and the other being movable toward and away from the fixed pin, resilient means for normally urging the movable member to engage in clamping condition a contact spring between the guide members, a contact spring support member disposed on the upper side of the base and having a guide pin extending upwardly therefrom adapted to engage the aperture in the spring to orient the longitudinal disposition of the spring in the fixture so that the contact end of the spring extends from the fixture by a predetermined amount, means pivotally connecting one end of the support member to said one end of the base, a slide block movable linearly along the base toward and away from said one end, an elongated element having one end pivotally connected to the slide block and the other end pivotally connected to the other end of the support member, an internally threaded member on the other end of the base, an externally threaded rotatable element extending through and in engagement with the internally threaded member for positioning the slide block along the base to pivot the support member in accordance with the particular bend in the spring to accurately control the angular disposition of the extended end of the spring with respect to the welding apparatus, graduations on the base spaced along the reciprocatable path of the slide block for accurately locating the slide block thereon for positioning the support member in predetermined angular settings as required for contact springs having various degrees of bends therein, and means for locking the externally threaded member against rotation.

References Cited in the file of this patent

UNITED STATES PATENTS

| | | |
|---|---|---|
| 943,289 | Wilhelm | Dec. 14, 1909 |
| 1,506,641 | Hunke et al. | Aug. 26, 1924 |
| 2,216,739 | Hines | Oct. 8, 1940 |
| 2,529,265 | Rose et al. | Nov. 7, 1950 |